(12) United States Patent
Takesue et al.

(10) Patent No.: US 12,679,247 B2
(45) Date of Patent: Jul. 14, 2026

(54) VEHICLE

(71) Applicant: TOYOTA JIDOSHA KABUSHIKI KAISHA, Toyota (JP)

(72) Inventors: Ippei Takesue, Nisshin (JP); Takahiro Misawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/820,630

(22) Filed: Aug. 30, 2024

(65) Prior Publication Data

US 2025/0206194 A1     Jun. 26, 2025

(30) Foreign Application Priority Data

Dec. 26, 2023    (JP) ................................. 2023-219588

(51) Int. Cl.
B60L 58/26        (2019.01)
B60H 1/00        (2006.01)
B60H 1/32        (2006.01)

(52) U.S. Cl.
CPC .......... B60L 58/26 (2019.02); B60H 1/00278 (2013.01); B60H 1/3208 (2013.01)

(58) Field of Classification Search
CPC ............... B60L 58/26; B60L 2240/545; B60H 1/00278; B60H 1/3208; Y02T 10/70
See application file for complete search history.

(56) References Cited

U.S. PATENT DOCUMENTS

| | | | | |
|---|---|---|---|---|
| 8,620,506 | B2 * | 12/2013 | Kummer | B60L 58/12 |
| | | | | 180/65.21 |
| 9,252,621 | B2 * | 2/2016 | Miyano | B60L 1/003 |
| 9,623,719 | B2 * | 4/2017 | Hatakeyama | B60L 58/26 |
| 2008/0275600 | A1 * | 11/2008 | Rask | B60L 58/27 |
| | | | | 701/22 |
| 2012/0291987 | A1 * | 11/2012 | Himmer | F28D 9/005 |
| | | | | 165/140 |
| 2012/0297809 | A1 * | 11/2012 | Carpenter | B60H 1/143 |
| | | | | 62/239 |
| 2012/0305662 | A1 | 12/2012 | Miyano | |

(Continued)

FOREIGN PATENT DOCUMENTS

| | | |
|---|---|---|
| JP | H05-276677 A | 10/1993 |
| JP | 2012-248452 A | 12/2012 |

(Continued)

*Primary Examiner* — Russell Frejd
*Assistant Examiner* — Ana D Thomas
(74) *Attorney, Agent, or Firm* — SoraIP, Inc.

(57)        ABSTRACT

The vehicle includes a power storage device, a cooling device, and a control device. The cooling device cools the power storage device together with driving of an electric compressor connected to the power line together with the power storage device. The control device transmits the required power to the external power supply device at the time of the external charging for charging the power storage device via the power line using the power from the external power supply device outside the vehicle. During the operation of the cooling device during the external charging, the control device transmits, to the external power supply device, power that is lower than the sum of the allowable input power of the power storage device and the power consumption of the electric compressor by a margin as the required power.

8 Claims, 4 Drawing Sheets

(56)        References Cited

U.S. PATENT DOCUMENTS

| | | | |
|---|---|---|---|
| 2014/0216709 A1* | 8/2014 | Smith | B60H 1/00278 |
| | | | 165/41 |
| 2014/0326430 A1* | 11/2014 | Carpenter | B60H 1/00278 |
| | | | 165/41 |
| 2015/0102118 A1* | 4/2015 | Hirabayashi | B60H 1/3213 |
| | | | 237/12.3 R |
| 2015/0183291 A1* | 7/2015 | Higuchi | B60H 1/00392 |
| | | | 62/133 |
| 2016/0018145 A1* | 1/2016 | Ragazzi | B60H 1/3214 |
| | | | 62/468 |
| 2017/0008375 A1* | 1/2017 | Blatchley | H01M 10/615 |
| 2017/0008407 A1* | 1/2017 | Porras | B60L 58/26 |
| 2020/0231060 A1 | 7/2020 | Matsuyama et al. | |
| 2022/0016958 A1 | 1/2022 | Komazawa et al. | |
| 2025/0260356 A1* | 8/2025 | Murayama | H02P 29/68 |

FOREIGN PATENT DOCUMENTS

| | | |
|---|---|---|
| JP | 2020-115715 A | 7/2020 |
| JP | 2022-018443 A | 1/2022 |

* cited by examiner

VEHICLE

CROSS-REFERENCE TO RELATED APPLICATION

This application claims priority to Japanese Patent Application No. 2023-219588 filed on Dec. 26, 2023, incorporated herein by reference in its entirety.

BACKGROUND

1. Technical Field

The present disclosure relates to a vehicle.

2. Description of Related Art

Hitherto, as a vehicle of this type, there has been proposed a vehicle including a power storage device, a duct, and a control device (see, for example, Japanese Unexamined Patent Application Publication No. 2012-248452 (JP 2012-248452 A)). The duct blows hot air toward the power storage device. The control device heats the power storage device by causing hot air to flow around the power storage device through the duct based on the temperature of the power storage device. This vehicle includes an evaporator of a cooling unit that dehumidifies hot air flowing around the power storage device. The control device causes the evaporator of an air conditioner to dehumidify the hot air flowing around the power storage device when determination is made that dew condensation occurs in the power storage device. In this vehicle, the control device may cause the evaporator of the air conditioner to dehumidify the periphery of the power storage device when the power storage device is charged by supplying electric power to the power storage device from a charger outside the vehicle. At this time, electric power to be consumed by an electric compressor of the air conditioner is supplied from the charger.

SUMMARY

In such a vehicle, during external charging in which electric power is supplied to the power storage device from the charger outside the vehicle to charge the power storage device, the sum of permissible input power of the power storage device and electric power to be consumed by the electric compressor may be transmitted to the charger as requested power. This is because the power storage device is charged with sufficiently large electric power. In this case, when the electric power consumed by the electric compressor decreases, actual electric power from the charger increases compared to the requested power due to a response delay of the charger, and the input power of the power storage device increases. There is a possibility that the input power exceeds the permissible input power.

The vehicle of the present disclosure suppresses an excess of input power of a power storage device over permissible input power during external charging.

The vehicle of the present disclosure adopts the following measures.

The vehicle of the present disclosure is a vehicle including a power storage device, a cooling device configured to cool the power storage device along with driving of an electric compressor connected to a power line together with the power storage device, and a control device configured to transmit requested power to an external power supply device outside the vehicle during external charging for charging the power storage device via the power line with electric power from the external power supply device. The control device is configured to transmit, to the external power supply device as the requested power, electric power that is lower by a margin than a sum of permissible input power of the power storage device and electric power to be consumed by the electric compressor while the cooling device is operating during the external charging.

In the vehicle of the present disclosure, the electric power that is lower by the margin than the sum of the permissible input power of the power storage device and the electric power to be consumed by the electric compressor is transmitted to the external power supply device as the requested power while the cooling device is operating during the external charging. The sum of the permissible input power of the power storage device and the electric power to be consumed by the electric compressor may be transmitted to the external power supply device as the requested power. In comparison with this case, the vehicle of the present disclosure can suppresses an excess of the input power of the power storage device over the permissible input power even if actual electric power from the external power supply device increases compared to the requested power and the input power of the power storage device increases due to a response delay of the external power supply device when the electric power to be consumed by the electric compressor decreases.

In the vehicle of the present disclosure, the margin may be set larger as a response delay period of the external power supply device increases. In this way, it is possible to more appropriately suppress the excess of the input power of the power storage device over the permissible input power when the electric power to be consumed by the electric compressor decreases.

In the vehicle of the present disclosure, the control device may be configured to, when a stop condition for the electric compressor is satisfied while the cooling device is operating during the external charging, stop the electric compressor after a response delay period of the external power supply device elapses from a change of the requested power to the permissible input power. In this way, it is possible to suppress the excess of the input power of the power storage device over the permissible input power even if the input power of the power storage device increases along with the stop of the electric compressor.

In the vehicle of the present disclosure, the control device may be configured to, when a predicted decrease amount of the electric power to be consumed by the electric compressor reaches a threshold value or more while the cooling device is operating during the external charging, reduce the electric power to be consumed by the electric compressor by the predicted decrease amount after a response delay period of the external power supply device elapses from a reduction of the requested power by the predicted decrease amount. In this way, it is possible to suppress the excess of the input power of the power storage device over the permissible input power even if the input power of the power storage device increases relatively greatly along with a relatively great decrease in the electric power to be consumed by the electric compressor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figures 1, 2:
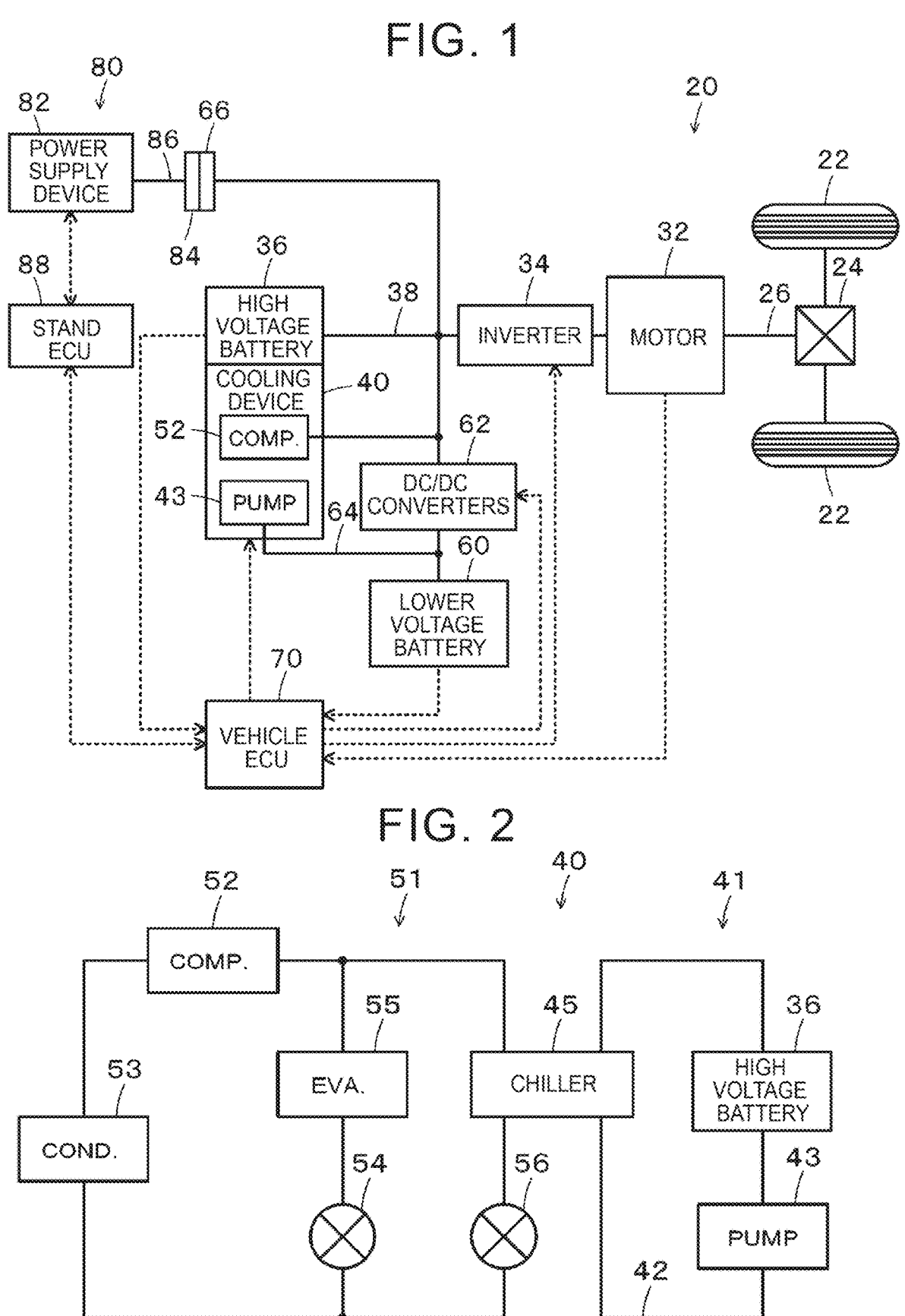
FIG. 1 is a schematic configuration diagram of a battery electric vehicle 20 according to an embodiment of the present disclosure and a charging stand 80 as an external power supply device.
FIG. 2 is a schematic configuration diagram of a cooling device 40 included in battery electric vehicle 20.

Embodiments of the present disclosure will be described with reference to the drawings. FIG. 1 is a schematic configuration diagram of a battery electric vehicle 20 and a charging stand 80 as an external power supply device according to an embodiment of the present disclosure. FIG. 2 is a schematic configuration diagram of the cooling device 40 included in battery electric vehicle 20. As illustrated in FIG. 1, battery electric vehicle 20 of the embodiment includes a motor 32, an inverter 34, and a high-voltage battery 36 as a power storage device. Battery electric vehicle 20 further includes a cooling device 40, a low-voltage battery 60, a DC/DC converter 62, a connector 66, and a vehicular electronic control unit (hereinafter referred to as "vehicle ECU") 70.

The motor 32 is configured as, for example, a synchronous generator motor, and the rotor of the motor 32 is connected to a drive shaft 26 connected to the drive wheel 22a,22b via a differential gear 24. The inverter 34 is configured as an inverter circuit having a plurality of switching elements, and is connected to the high-voltage battery 36 via a high-voltage power line 38. The motor 32 is rotationally driven by switching control of the plurality of switching elements of the inverters 34 by the vehicle ECU 70.

The high-voltage battery 36 is configured as, for example, a lithium-ion secondary battery or a nickel-hydrogen secondary battery having a rated voltage of about several hundred V, and is connected to the high-voltage power line 38 as described above.

The cooling device 40 is configured as a device for cooling the high-voltage battery 36. As illustrated in FIG. 2, the cooling device 40 includes a first thermal circuit 41 and a second thermal circuit 51. The first thermal circuit 41 includes a flow path 42, an electric pump 43, and a chiller 45. The flow path 42 is a flow path for circulating the heat exchange medium (coolant) to the battery flow path of the high-voltage battery 36, the electric pump 43, and the chiller 45. The electric pump 43 is connected to the low-voltage power line 64 (see FIG. 1), and pumps the heat exchange medium in the flow path 42. Details of the chiller 45 will be described later.

The second thermal circuit 51 includes an electric compressor 52, a condenser 53, an expansion valve 54, an evaporator 55, an expansion valve 56, and a chiller 45. The electric compressor 52 is connected to the high-voltage power line 38 (see FIG. 1), and compresses the refrigerant from the evaporator 55 and the chiller 45 to form a high-temperature and high-pressure gas refrigerant. The condenser 53 converts the refrigerant from the electric compressor 52 into a liquid refrigerant having a normal temperature and a high pressure by heat exchange with air.

The expansion valve 54 reduces the pressure of the refrigerant from the condenser 53 to a low-temperature and low-pressure gas-liquid mixture refrigerant. The evaporator 55 converts the refrigerant from the expansion valve 54 into a low-temperature and low-pressure gas refrigerant by heat exchange with air. Therefore, the electric compressor 52, the condenser 53, the expansion valve 54, and the evaporator 55 function as a refrigeration cycle. The expansion valve 56 reduces the pressure of the refrigerant from the condenser 53 to a low-temperature and low-pressure gas-liquid mixture refrigerant. The chiller 45 performs heat exchange between the refrigerant from the expansion valve 56 and the heat exchange medium in the flow path 42 of the first thermal circuit 41. As a result, the heat exchange medium in the flow path 42 of the first thermal circuit 41 is cooled when the second thermal circuit 51 is operating. Then, the high-voltage battery 36 is cooled by the heat exchange medium in the flow path 42.

As shown in FIG. 1, the low-voltage battery 60 is configured as a lead-acid battery having a 12V rated voltage, for example, and is connected to the low-voltage power line 64. DC/DC converters 62 are connected to the high-voltage power line 38 and the low-voltage power line 64, and step down the power of the high-voltage power line 38 to be supplied to the low-voltage power line 64.

The connector 66 is connected to the high-voltage power line 38 and is configured to be connectable to the connector 84 of the charging stand 80. Thus, battery electric vehicle 20 can charge the high-voltage battery 36 using the power of the charging stand 80 when the connector 84 and the connector 66 are connected.

The vehicle ECU 70 includes a microcomputer having a CPU, ROM, RAM, a flash memory, an input/output port, and a communication port. The vehicle ECU 70 receives signals from various sensors via an input port. For example, the vehicle ECU 70 receives the rotational position Om of the rotor of the motor 32 from the rotational position sensor and the phase current Iu,Iv,Iw of each phase of the motor 32 from the current sensor. The vehicle ECU 70 also receives the voltage Vbh of the high-voltage battery 36 from the voltage sensor, the input/output current Ibh to the high-voltage battery 36 from the current sensor, and the temperature Tbh of the high-voltage battery 36 from the temperature sensor. The vehicle ECU 70 also receives the voltage Vbl of the low voltage battery 60 from the voltage sensor. The vehicle ECU 70 also receives power consumption Pc by the electric compressor 52 of the cooling device 40 from the power sensor. The vehicle ECU 70 also receives a start signal from the start switch, a shift position SP that is an operating position of the shift lever from the shift position sensor, an accelerator pedal position AP, a brake pedal position BP, and a vehicle speed V from the vehicle speed sensor. The accelerator pedal position AP is a depression amount of the accelerator pedal from the accelerator pedal position sensor. The brake pedal position BP is a depression amount of the brake pedal from the brake pedal position sensor.

The vehicle ECU 70 outputs various control signals via an output port. For example, the vehicle ECU 70 outputs control signals to the inverters 34, control signals to the cooling devices 40 (the electric pumps 43 and the electric compressors 52), and control signals to DC/DC converters 62.

The vehicle ECU 70 performs various calculations. For example, the vehicle ECU 70 calculates the electric angle θe and the rotational speed Nm of the motor 32 based on the rotational position Om of the rotor of the motor 32. The vehicle ECU 70 also calculates the power storage ratio SOC of the high-voltage battery 36 based on the integrated value of the current Ibh of the high-voltage battery 36. The vehicle ECU 70 also calculates an input limit Win, which is an allowable input power of the high-voltage battery 36, based on the power storage ratio SOC and the temperature Tbh of the high-voltage battery 36. The vehicle ECU 70 also calculates the input/output power Pb of the high-voltage battery 36 based on the voltage Vbh and the input/output current Ibh of the high-voltage battery 36. The vehicle ECU 70 can communicate with a stand electronic control unit (hereinafter referred to as a "stand ECU") of the charging stand 80 by wire or wirelessly.

The charging stand 80 is provided at a home, a charging station, or the like. The charging stand 80 includes a power supply device 82, a connector 84, and a stand ECU 88. The power supply device 82 is connected to the connector 84 via a power line 86. The power supply device 82 is configured to convert AC power from the power system into DC power and to adjust output power (output voltage and output current) so as to be output. The connector 84 is configured to be connectable to the connector 66 of battery electric vehicle 20. When the connector 84 and the connector 66 are connected, the power line 86 and the high-voltage power line 38 are connected.

The stand ECU 88 includes a microcomputer having a CPU, ROM, RAM, a flash memory, an input/output port, and a communication port. The stand ECU 88 receives the output voltage Vs of the power supply device 82 from the voltage sensor and the output current Is of the power supply device 82 from the current sensor. The stand ECU 88 outputs various control signals via an output port. For example, the stand ECU 88 provides a control signal to the power supply device 82. The stand ECU 88 calculates the output power Ps based on the output voltage Vs and the output current Is of the power supply device 82. As described above, the stand ECU 88 can communicate with battery electric vehicle 20 vehicle ECU 50 by wire or wirelessly.

Figure 3:
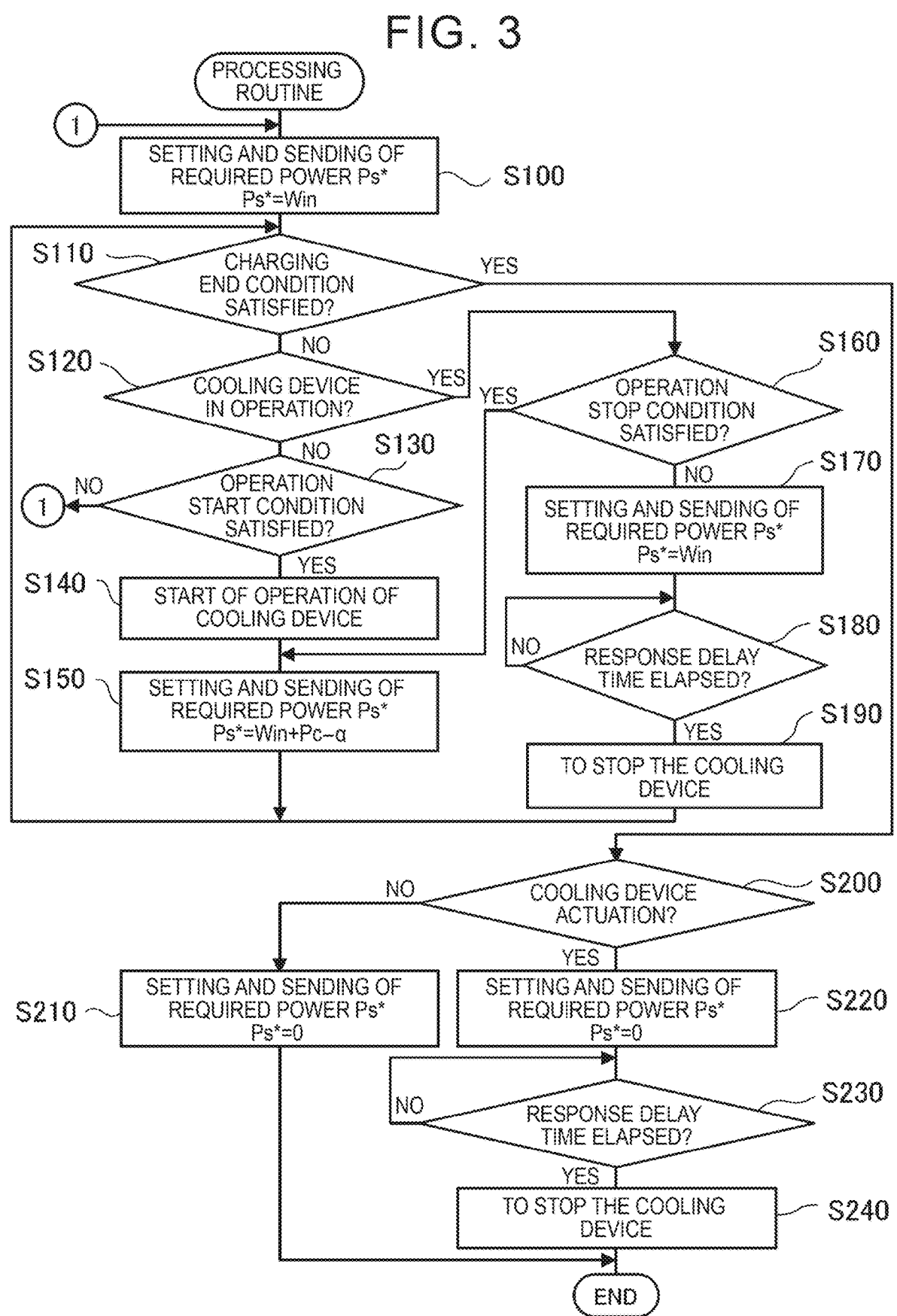
FIG. 3 is a flow chart illustrating an exemplary process routine executed by the vehicle ECU 70.

Next, the operation of battery electric vehicle 20 of the embodiment will be described. In particular, an operation when the high-voltage battery 36 is externally charged using the electric power of the charging stand 80 will be described. FIG. 3 is a flow chart illustrating an exemplary process performed by the vehicle ECU 70. This routine is executed when the connector 66 of battery electric vehicle 20 and the connector 84 of the charging stand 80 are connected by the user and the external charging is started. As the start condition of the external charging, for example, a condition in which a charging start button provided in the charging stand 80 is pressed by the user or the like is used. In the following explanation, the input/output power Pb and the input limit Win of the high-voltage battery 36 are positive on the input to the high-voltage battery 36.

When the process routine of FIG. 3 is executed, the vehicle ECU 70 sets the input limit Win of the high-voltage battery 36 to the required power Ps*, and transmits the set required power Ps* to the stand ECU 88 of the charging stand 80 (S100). Upon receiving the required power Ps, the stand ECU 88 controls the power supply device 82 by the power feedback control so that the difference between the output power Ps of the power supply device 82 and the required power Ps* is canceled out. As a result, the high-voltage battery 36 is charged by the electric power supplied from the charging stand 80 to battery electric vehicle 20.

Next, it is determined whether or not the external charge termination condition is satisfied (S110). As a condition for terminating the external charge, for example, a condition in which the power storage ratio SOC of the high-voltage battery 36 reaches a threshold Sref or more in the vicinity of the full charge ratio is used. In the embodiment, it is determined that the operation stop condition of the cooling device 40 is also satisfied when the external charging end condition is satisfied during the operation of the cooling device 40.

When it is determined in S110 that the condition for terminating the external charge is not satisfied, it is determined whether or not the cooling device 40 is in operation (S120). When it is determined that the cooling device 40 is not in operation, that is, is stopped, it is determined whether or not the condition for starting the operation of the cooling device 40 is satisfied (S130). As a condition for starting the operation of the cooling device 40, for example, a condition in which the temperature Tbh of the high-voltage battery 36 is equal to or higher than the threshold Tbref1 is used. When it is determined that the operation starting condition of the cooling device 40 is not satisfied, the process returns to S100. In this case, the input-limit Win of the high-voltage battery 36 is set to the required power Ps*.

When it is determined that the operation start condition of the cooling device 40 is satisfied in S130, the operation of the cooling device 40 is started (S140). In the operation of the cooling device 40, in the embodiment, the electric compressor 52 and the electric pump 43 are controlled so that the higher the temperature Tbh of the high-voltage battery 36, the higher the rotational speed of the electric compressor 52 and the electric pump 43 (the higher the cooling performance of the cooling device 40). Therefore, the higher the temperature Tbh of the high-voltage battery 36, the greater the power consumption Pc of electric compressor 52.

When the operation of the cooling device 40 is started in this way, the power (Win+Pc−α) obtained by subtracting the margin α from the sum of the input-limit Win of the high-voltage battery 36 and the power consumption Pc of the electric compressor 52 is set to the required power Ps* (S150). The set required power Ps* is transmitted to the stand ECU 88 of the charging stand 80 (S150), and S110 returns. The reason why the power (Win+Pc−α) instead of the power (Win+Pc) of the sum of the input-limit Win of the high-voltage battery 36 and the power consumption Pc of the electric compressor 52 is set to the required power Ps*, and the margin α will be described later.

When it is determined in S120 that the cooling device 40 is in operation, it is determined whether or not the condition for stopping the operation of the cooling device 40 is satisfied (S160). As a condition for stopping the operation of the cooling device 40, for example, a condition in which the temperature Tbh of the high-voltage battery 36 is less than the threshold Tbref2 equal to or less than the threshold Tbref1 is used. When it is determined that the operation stopping condition of the cooling device 40 is not satisfied, the operation of the cooling device 40 is continued, and the process proceeds to S150 process. Here, the setting of the power (Win+Pc−α) to the required power Ps* is continued.

The reason why the power (Win+Pc−α) is set to the required power Ps* instead of the power (Win+Pc) during the operation of the cooling device 40 during the external charge and the detailed explanation of the margin α will be given. When the power consumption Pc of the electric compressor 52 decreases during the operation of the cooling device 40 during the external charge, the required power Ps* transmitted from the vehicle ECU 70 to the stand ECU 88 decreases, and the output power Ps of the power supply device 82 decreases. At this time, the power Ps of the power supply device 82 is delayed with respect to the power consumption Pc by the electric compressor 52 due to the response delay of the charging stand 80. The response delay of the charging stand 80 is based on a communication delay between the vehicle ECU 70 and the stand ECU 88, a control delay of the power supply device 82 by the stand ECU 88, and the like. Due to the response delay of the charging stand 80, when the power consumption Pc of the electric compressor 52 decreases, the output power Ps of the power supply device 82 increases with respect to the required power Ps\*, and the input/output power Pb of the high-voltage battery 36 may be increased. Therefore, during the operation of the cooling device 40 in the external charge, the power (Win+Pc) is set to the required power Ps\*, and is transmitted to the stand ECU 88. Then, when the power consumption Pc of the electric compressor 52 decreases, the input/output power Pb of the high-voltage battery 36 may exceed the input limit Win. On the other hand, in the embodiment, during the operation of the cooling device 40 in the external charge, the power (Win+Pc−α) is set to the required power Ps\*, and is transmitted to the stand ECU 88. In some cases, the power (Win+Pc) is set to the required power Ps\* and transmitted to the stand ECU 88. As a result, even if the input/output power Pb of the high-voltage battery 36 is increased when the power consumption Pc of the electric compressor 52 is reduced, it is possible to prevent the input/output power Pb from exceeding the input limit Win. The margin α is determined based on a response delay of the charging stand 80. For example, the vehicle ECU 70 may receive a response delay time Td (specification value) of the charging stand 80 from the stand ECU 88, and set the margin α based on the response delay time Td (specification value). Further, a margin α may be set based on the calculated response delay time Td by transmitting a test power command Pt\* such as a square wave, a sawtooth wave, or a triangular wave from the vehicle ECU 70 to the stand ECU 88, detecting the input/output power Pb of the high-voltage battery 36 or receiving the output power Ps of the power supply device 82, and calculating the response delay time Td of the charging stand 80 based on the test power command Pt\* and the input/output power Pb or the output power Ps. In the embodiment, the margin α is set to be larger as the response-delay-time Td of the charging stand 80 is longer. This is because, when the power consumption Pc of the electric compressor 52 decreases, the deviation between the required power Ps\* and the output power Ps of the power supply device 82 tends to increase, and the input/output power Pb of the high-voltage battery 36 tends to increase greatly. By setting the margin α in this way, it is possible to more appropriately suppress the input/output power Pb of the high-voltage battery 36 from exceeding the input limit Win when the power consumption Pc of the electric compressor 52 decreases.

When it is determined in S160 that the condition for stopping the operation of the cooling device 40 is satisfied, the input limit Win of the high-voltage battery 36 is set, and the set required power Ps\* is transmitted to the stand ECU 88 of the charging stand 80 at the required power Ps\* (S170). After the response-delay-time Td of the charge stand 80 has elapsed (S180), the cooling device 40 (the electric compressor 52) is stopped (S190), and S110 is returned. When the cooling device 40 (the electric compressor 52) is stopped, there is a possibility that the input/output power Pb of the high-voltage battery 36 is relatively greatly increased due to the response delay of the charging stand 80 described above. Stopping the cooling device 40 (the electric compressor 52) means that the power consumption Pc of the electric compressor 52 becomes zero. In view of this, in the embodiment, the cooling device 40 (the electric compressor 52) is stopped after the response-delay-time Td of the charging stand 80 elapses after the required power Ps\* is changed from the power (Win+Pc−α) to the input limit Win. Accordingly, even if the input/output power Pb of the high-voltage battery 36 is increased as the electric compressor 52 is stopped, it is possible to suppress the input/output power Pb from exceeding the input limit Win.

When it is determined in S110 that the condition for terminating the external charge is satisfied, it is determined whether or not the cooling device 40 is in operation (S200). Then, when it is determined that the cooling device 40 is not in operation, that is, is stopped, the value 0 is set to the required power Ps\*, and the set required power Ps\* is transmitted to the stand ECU 88 of the charging stand 80 (S210), and this routine is ended. The stand ECU 88 shuts down the power supply device 82 upon receiving the required power Ps\*, which has a value of 0.

When it is determined in S200 that the cooling device 40 is in operation, the required power Ps is set to 0, and the set required power Ps\* is transmitted (S210) to the stand ECU 88 of the charging stand 80. After the response-delay-time Td of the charging stand 80 has elapsed (S220), the cooling device 40 is stopped (S230) and the routine ends.

Figure 4:
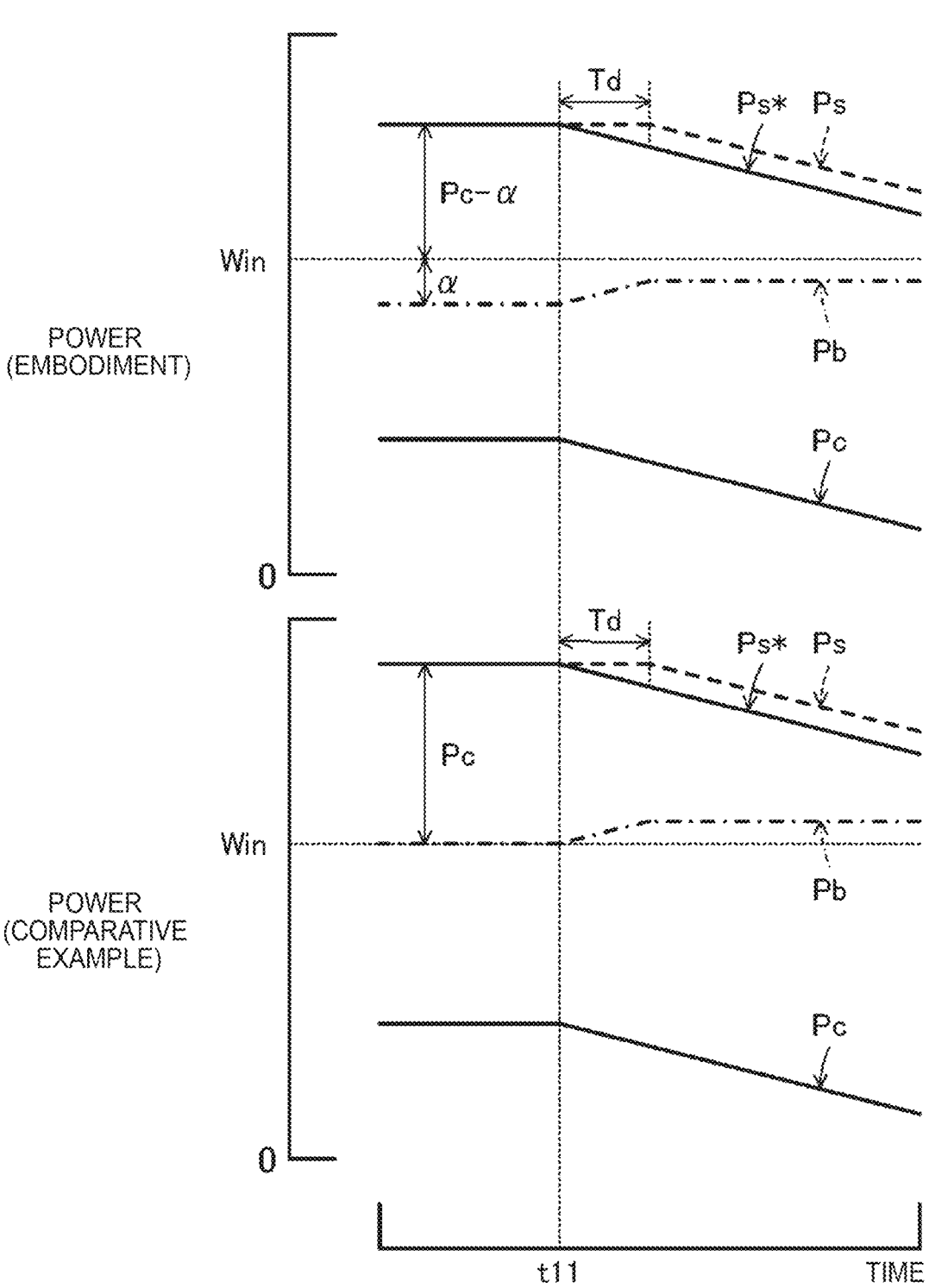
FIG. 4 is an explanatory diagram illustrating an exemplary state at the time of external charging.
Figure 5:
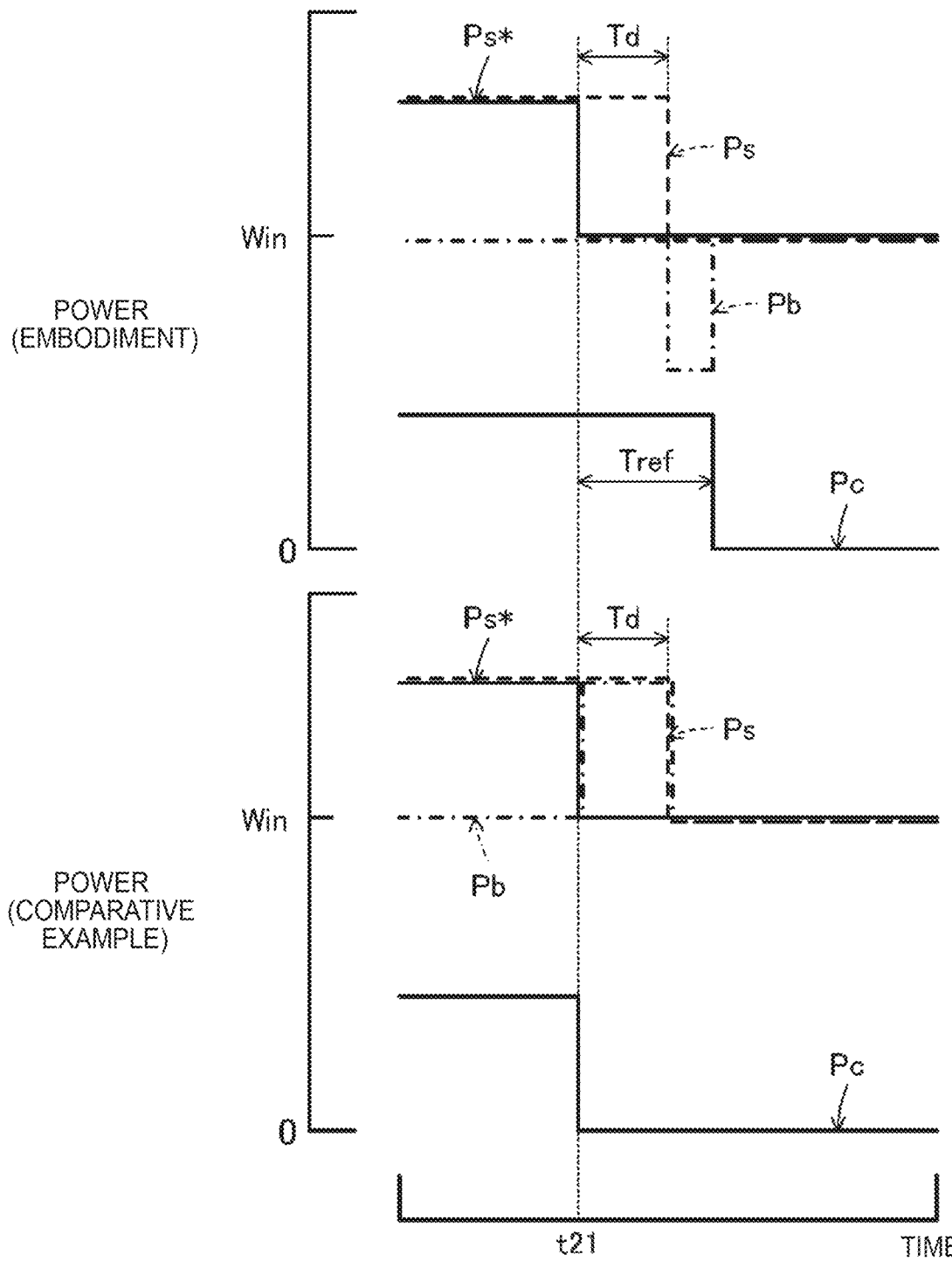
FIG. 5 is an explanatory diagram illustrating an example of a state at the time of external charging.

FIG. 4 and FIG. 5 are explanatory diagrams illustrating an example of a state at the time of external charging. In FIG. 4 and FIG. 5, the input-limit Win and the input/output power Pb of the high-voltage battery 36 and the power consumption Pc of the electric compressor 52 are illustrated as the respective electric powers. Further, in FIGS. 4 and 5, the required power Ps transmitted from battery electric vehicle 20 to the charging stand 80\* and the power Ps of the charging stand 80 (power supply device 82) are illustrated. In FIG. 4 and FIG. 5, the upper row shows the state of the embodiment, and the lower row shows the state of the comparative example. The comparative example of FIG. 4 differs from the embodiment in which the power (Win+Pc) is set to the required power Ps\*, and the power (Win+Pc−α) is set to the required power Ps\*. In the comparative example of FIG. 5, when the operation stop condition of the cooling device 40 is satisfied, the cooling device 40 (the electric compressor 52) is stopped and the required power Ps\* is lowered. In this respect, the embodiment differs from the embodiment in which the cooling device 40 is stopped after the response-delay-time Td of the charging stand 80 elapses after the required power Ps\* is changed to the input-limit Win.

As shown in FIG. 4, in the example and the comparative example, the required power Ps\* decreases as the power consumption Pc of the electric compressor 52 decreases from the time t11. Then, the power Ps of the charge stand 80 decreases with a response-delay-time Td with respect to the required power Ps\*. In the comparative example, by setting the power (Win+Pc) to the required power Ps\*, the input/output power Pb of the high-voltage battery 36 is increased and the input limit Win is exceeded. On the other hand, in the embodiment, by setting the power (Win+Pc−α) to the required power Ps\*, even if the input/output power Pb of the high-voltage battery 36 is increased, it is possible to suppress the input/output power Pb from exceeding the input limit Win.

As shown in FIG. 5, in the comparative example, when the operation stop condition of the cooling device 40 is satisfied t21 the time, the cooling device 40 (the electric compressor 52) is stopped, that is, the power consumption Pc of the electric compressor 52 becomes 0, and the required power Ps* is lowered. As a result, the input/output power Pb of the high-voltage battery 36 is increased and exceeds the input limit Win. On the other hand, in the embodiment, when the operation stop condition of the cooling device 40 is satisfied t21 the time, the cooling device 40 is stopped after the response delay time Td of the charging stand 80 elapses after the required power Ps* is lowered. Accordingly, it is possible to suppress the input/output power Pb of the high-voltage battery 36 from exceeding the input limit Win.

In battery electric vehicle 20 of the present embodiment described above, during the operation of the cooling device 40 (the electric compressor 52) at the time of external charging, the power (Win+Pc−α) obtained by subtracting the margin α from the sum of the input limit Win of the high-voltage battery 36 and the power consumption Pc of the electric compressor 52 is set to the required power Ps*, and is transmitted to the stand ECU 88 of the charging stand 80. The power (Win+Pc) of the sum of the input-limit Win of the high-voltage battery 36 and the power consumption Pc of the electric compressor 52 may be set to the required power Ps*, and transmitted to the stand ECU 88. As a result, even if the input/output power Pb of the high-voltage battery 36 is increased when the power consumption Pc of the electric compressor 52 decreases, it is possible to suppress the input/output power Pb from exceeding the input limit Win.

Further, in battery electric vehicle 20, during the operation of the cooling device 40 (the electric compressor 52) during the external charge, the operation stopping condition of the cooling device 40 may be satisfied in some cases. At this time, the cooling device 40 is stopped after the response-delay-time Td of the charging stand 80 elapses after the required power Ps* is changed from the power (Win+Pc−α) to the input-limit Win. Accordingly, even if the input/output power Pb of the high-voltage battery 36 is increased as the electric compressor 52 is stopped, it is possible to suppress the input/output power Pb from exceeding the input limit Win.

In the above-described embodiment, the vehicle ECU 70 sets the margin α to be larger as the response-delay-time Td of the charging stand 80 is longer, but the present disclosure is not limited thereto. For example, the vehicle ECU 70 may set the margin α by guarding the temporary margin αtmp, which becomes larger as the response-delay-time Td of the charge stand 80 becomes longer, at the power consumption Pc of the electric compressor 52. In addition, the margin α may be a predetermined value based on a normal value (a common value) of the response-delay-time Td of the charge stand 80.

In the above-described embodiment, the vehicle ECU 70 may satisfy the condition for stopping the operation of the cooling device 40 during the operation of the cooling device 40 (the electric compressor 52) during the external charge. At this time, it is assumed that the cooling device 40 is stopped after the response-delay-time Td of the charging stand 80 elapses after the required power Ps* is changed from the power (Win+Pc−α) to the input limit Win. However, additionally or alternatively, when the predicted decrease amount ΔPces of the power consumption Pc of the electric compressor 52 reaches the threshold Pcref or more during the operation of the cooling device 40 during the external charging, the power consumption Pc of the electric compressor 52 may be decreased by the predicted decrease amount ΔPces after the response delay time Td of the charging stand 80 has elapsed after the required power Ps* is decreased by the predicted decrease amount ΔPces. In this way, even if the input/output power Pb of the high-voltage battery 36 is increased relatively greatly with a relatively large decrease in the power consumption Pc of the electric compressor 52, it is possible to suppress the input/output power Pb from exceeding the input limit Win. The predicted decrease amount ΔPces of the power consumption Pc of the electric compressor 52 can be calculated based on the transition of the temperature Tbh of the high-voltage battery 36, the transition of the cooling performance of the cooling device 40 (for example, the transition of the rotational speed of the electric compressor 52 or the electric pump 43), and the like.

In the above-described embodiment, the cooling device 40 includes the first thermal circuit 41 and the second thermal circuit 51. The first thermal circuit 41 includes a flow path 42, an electric pump 43, and a chiller 45. The second thermal circuit 51 includes an electric compressor 52, a condenser 53, an expansion valve 54, an evaporator 55, an expansion valve 56, and a chiller 45. However, it is not limited thereto. For example, the flow path 42, the electric pump 43, the chiller 45, and the expansion valve 56 may not be provided. In this case, the air cooled by heat exchange between the evaporator 55 and the air may be blown to the high-voltage battery 36.

In the above-described embodiment, battery electric vehicle 20 including the motor 32, the inverter 34, the high-voltage battery 36, and the cooling device 40 is configured, but the present disclosure is not limited thereto. For example, hybrid electric vehicle may be configured to further include an engine in addition to the same configuration as battery electric vehicle 20. Further, fuel cell electric vehicle may be configured to further include a fuel-cell in addition to the same configuration as battery electric vehicle 20.

The correspondence between the main elements of the embodiments and the main elements of the disclosure described in the column of the means for solving the problem will be described. In the embodiment, the high-voltage battery 36 corresponds to a "power storage device", the cooling device 40 including the electric compressor 52 corresponds to a "cooling device", and the vehicle ECU 70 corresponds to a "control device".

It should be noted that the correspondence between the main elements of the embodiment and the main elements of the disclosure described in the section of the means for solving the problem is an example for specifically explaining the embodiment of the disclosure described in the section of the means for solving the problem. Therefore, the elements of the disclosure described in the section of the means for solving the problem are not limited. That is, the interpretation of the disclosure described in the section of the means for solving the problem should be performed based on the description in the section, and the embodiments are only specific examples of the disclosure described in the section of the means for solving the problem.

Although the embodiments for carrying out the present disclosure have been described using the embodiments, it is needless to say that the present disclosure is not limited to such embodiments, and can be implemented in various forms without departing from the gist of the present disclosure.

The present disclosure is applicable to a manufacturing industry of a vehicle and the like.

What is claimed is:

1. A vehicle comprising:
a power storage device;

a cooling device configured to cool the power storage device by driving an electric compressor connected to a power line together with the power storage device; and a control device configured to determine whether to start an operation of the cooling device during external charging for charging the power storage device via the power line with electric power from an external power supply device provided outside the vehicle, set a value of requested power based on a response delay period of the external power supply device in response to a determination to start the operation of the cooling device, the response delay period being a time period from a timing when the set value is transmitted to the external power supply device until the external power supply device outputs the requested power at the set value, the value of the requested power being set lower by a margin than a sum of an upper limit value of input power of the power storage device and a value of electric power to be consumed by the electric compressor, and the margin being set larger when the response delay period is a first time period than when the response delay period is a second time period that is shorter than the first time period, and transmit the set value to the external power supply device.

2. The vehicle according to claim 1, wherein the control device is configured to, in a case where a stop condition for the electric compressor is satisfied while the cooling device is operating during the external charging, update the value of the requested power to the upper limit value of the input power of the power storage device, and stop the electric compressor after the response delay period of the external power supply device elapses from the update of the value of the requested power.

3. The vehicle according to claim 1, wherein the control device is configured to, in a case where a predicted decrease amount of the electric power to be consumed by the electric compressor reaches a threshold value or more while the cooling device is operating during the external charging, reduce the electric power to be consumed by the electric compressor by the predicted decrease amount after the response delay period of the external power supply device elapses from a reduction of the requested power by the predicted decrease amount.

4. The vehicle according to claim 1, wherein the control device is further configured to set the value of the requested power to the upper limit value of the input power of the power storage device, in response to a determination not to start the operation of the cooling device.

5. The vehicle according to claim 1, wherein the control device is further configured to receive information indicating the response delay period from the external power supply device, and set the margin based on the received response delay period.

6. The vehicle according to claim 1, wherein the control device is further configured to transmit a test command to the external power supply device, after transmitting the test command, detect an input and output power of the power storage device and an output power of the external power supply device, calculate the response delay period based on the test command, the detected input and output power of the power storage device, and the detected output power of the external power supply device, and set the margin based on the calculated response delay period.

7. The vehicle according to claim 1, wherein the control device is configured to, in a case where a charging end condition is satisfied while the cooling device is operating, update the value of the requested power to zero, and stop the cooling device after the response delay period elapses from the update of the value of the requested power.

8. The vehicle according to claim 7, wherein the charging end condition is that a state of charge of the power storage device reaches a predetermined threshold.

* * * * *